(No Model.) 3 Sheets—Sheet 2.
A. RODGERS.
LUMBER TRIMMER.
No. 330,803. Patented Nov. 17, 1885.
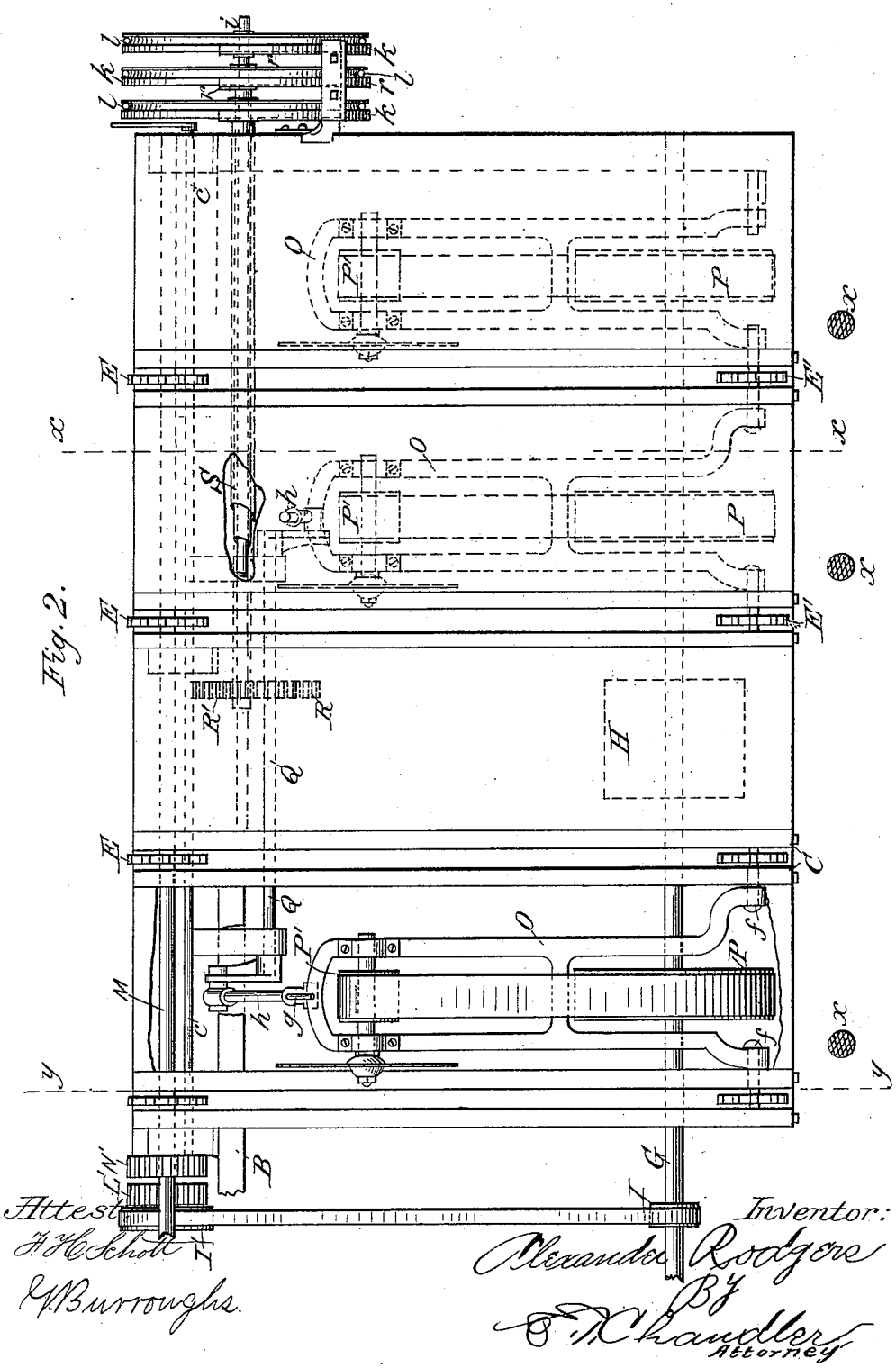

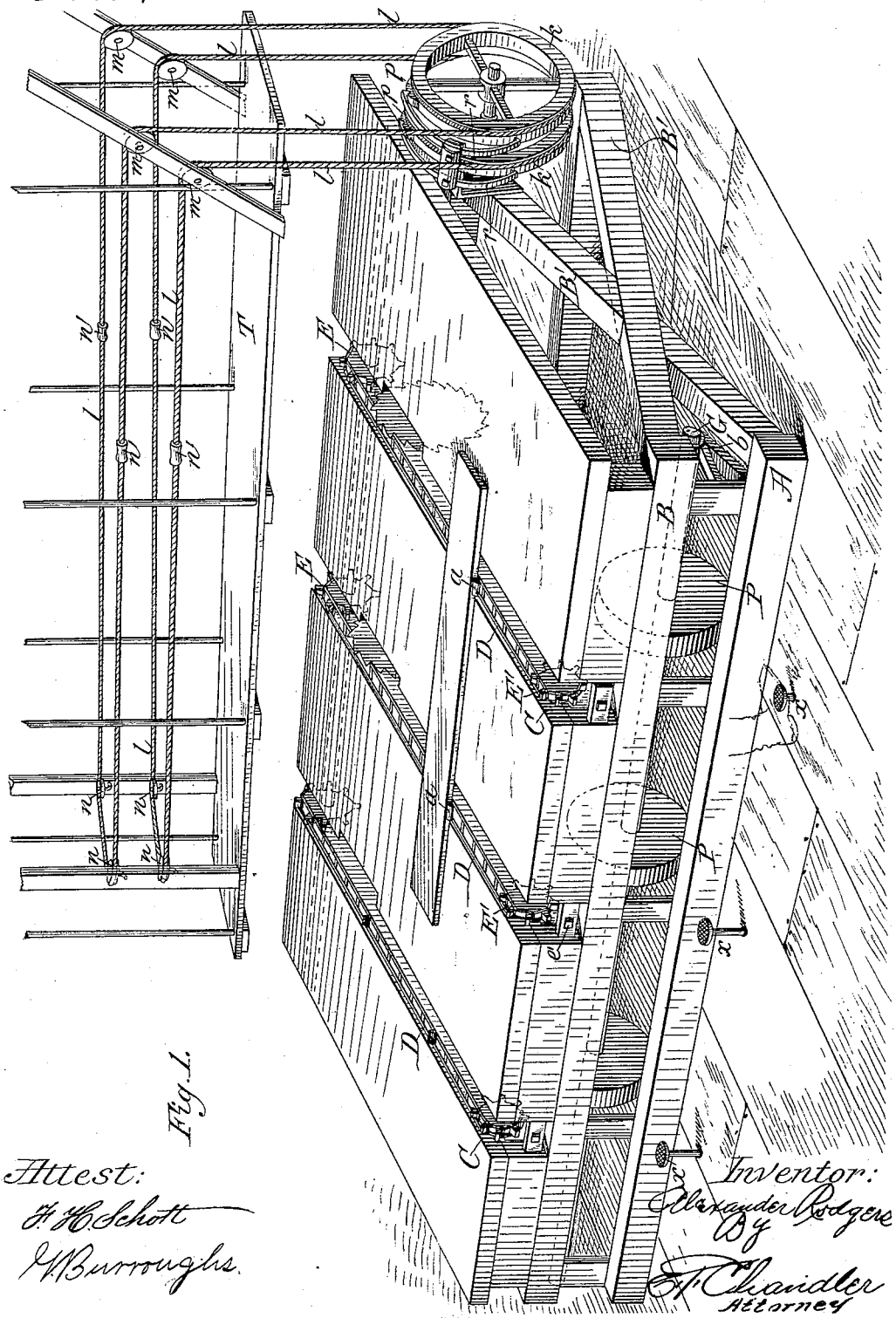

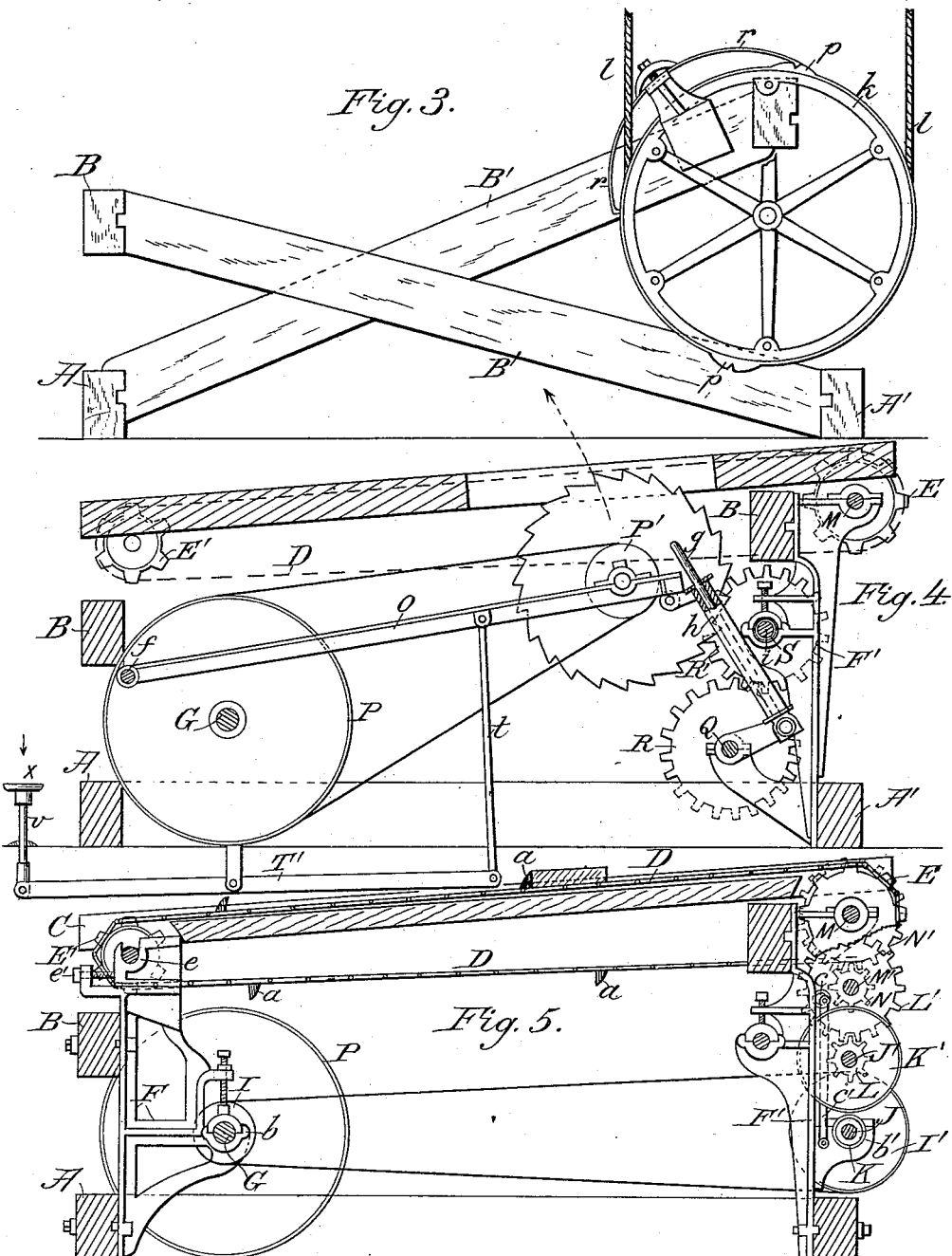

UNITED STATES PATENT OFFICE.

ALEXANDER RODGERS, OF MUSKEGON, MICHIGAN.

LUMBER-TRIMMER.

SPECIFICATION forming part of Letters Patent No. 330,803, dated November 17, 1885.

Application filed April 15, 1885. Serial No. 162,279. (No model.)

*To all whom it may concern:*

Be it known that I, ALEXANDER RODGERS, a citizen of the United States, residing at Muskegon, in the county of Muskegon and State of Michigan, have invented certain new and useful Improvements in Lumber-Trimmers, of which the following is a specification, reference being had to the accompanying drawings.

This invention relates to an improvement in that class of machinery employed in removing the damaged or imperfect ends of pieces of lumber, and which are known as "lumber-trimmers." These lumber-trimmers usually form a part of the outfit of a saw-mill, and are so placed that the imperfect lumber as it comes from the saws may be readily passed on to the table of the trimmer. Heretofore these machines have been constructed with a single circular saw placed in a swinging frame, which was hinged upon or oscillated from a driving-shaft placed at a suitable point above or below the surface of the table upon which the lumber rested, and which frame and saw were swung to and fro, as desired by an attendant. Another form of trimmer had a series of saws placed in swinging frames, generally beneath the table, the lumber being carried across the same by means of carrying-chains, which traversed its surface at right angles to its length; the saw or saws which happened to be nearest to the points at which it was desired to sever the piece of lumber being elevated above the surface of the table by means of levers operated by the attendant. In these machines it is evident that the operator could make but one cut at a time. If both ends of the piece were to be removed, he was compelled to bring the saws into operation one after the other, as there was no means of actuating two or more of them simultaneously.

The object of the present invention is therefore to so improve these machines that the operator shall have a full view of the board or other piece of lumber as it lies upon the table, thus enabling him to determine the best location for and proper number of cuts to be made, and to make those cuts simultaneously, thus saving time and giving an improved product.

The invention therefore consists in providing the machine with an elevated stand for the operator, placed over the table in such a position as to give him an unobstructed view of its whole surface and of the lumber which may be upon it.

It further consists in the arrangement of the devices by which the saws are placed under the control of the operator at any point upon the elevated stand which he may happen to occupy at the time the lumber is placed upon the table; and it further consists in the construction and arrangement of the operating mechanism, as will hereinafter be fully described, and specifically pointed out in the claims.

In the drawings forming a part of this specification, Figure 1 is a perspective view of a part of the machine, showing the elevated stand and general arrangement of the operating mechanism. Fig. 2 is a plan, a part of the table-top being removed to show the construction of one of the swinging saw-frames. Fig. 3 is an end view showing the method of bracing the table-frame. Fig. 4 is a vertical transverse section of the table, presenting a side view of a saw, its frame, and operating mechanism. Fig. 5 is also a transverse section showing the arrangement of the carrying-chains and the mechanism by which they are put in motion.

The machine stands upon the floor, which is preferably that portion of the mill-floor in the vicinity and rear of the saws which cut the lumber from the log. Its frame consists of the side sills, A, and end sills, A'. At a suitable height above the sills A, and supported by short posts or brackets, which form the vertical connection between them, and also carry the shafting of the machine, are the beams B, carrying the table-top. These beams are also connected with the sills at the ends of the machine, and, if desired, at other points in its length by the cross-braces B', which serve to connect and stiffen the whole frame. It will be observed that the top of the table is slightly inclined, its rear being higher than the front, and that it is pierced by a series of transverse slits or apertures, through which the circular saws pass when it is desired to bring either of them into action. The length of the machine and the number of trimming-saws employed is of course determined by the length and quality of the lumber to be trimmed; but the construction and arrangement of parts is substantially the same, no matter what may be its length or the number of saws employed. Traversing the table from side to side is a series of parallel ways, C, which may, if desired, project slightly above its general surface, and have formed in them channels which serve as guides for the endless carrying-chains D. These chains run upon the sprocket-wheels E and E' at opposite sides of the table, and are provided with projections $a$, against which the lumber rests as it is carried forward. Motion is imparted to these carrying-chains in the following manner: Securely bolted to the inner sides of the sill A and beam B, at the front of the machine, are the brackets or hangers F, in any desired number, each being provided with a projecting tongue which enters mortises in the sill and beam. These brackets are provided with a journal-box, $b$, and in these journal-boxes rests and revolves the driving-shaft G, said shaft being rotated by a belt from a pulley on any suitable shaft of the mill to the pulley H. On shaft G is also secured the small pulley I, a belt from which conveys motion to the pulley I' of shaft J. This shaft revolves in journal-boxes $b'$, attached to and sliding vertically on the brackets F', secured to the sill and beam at the rear of the machine by tongues and bolts in the same manner as the brackets F at the front. This shaft J carries a friction-pulley, K, which engages with the large friction-pulley K' upon the shaft J', also carried by bearings attached to the bracket F'. A shaft, $c$, provided at one end with an eccentric and at the other with a hand-lever, is connected by the rod $c'$ with the sliding journal-box $b'$, so that by operating the lever at the end of the machine the eccentric at the opposite end of the shaft $c$ will draw the two friction-wheels together, causing the shaft J' to receive motion from the shaft J. Secured to this shaft J is a pinion, L, which engages with the gear-wheel L' upon the short counter-shaft M', and a pinion, N, upon this counter-shaft engages the spur-gear N' upon the shaft M, which carries the sprocket-wheels E, that give motion to the carrying-chains. The bearings $e$, in which the sprocket-wheels E' revolve at the front of the table, are made to slide upon the top of the brackets F, so that by turning the screws $e'$, which pass through a projection on the top of the bracket and into the bearing, the latter may be drawn out, thus straining the endless carrying-chains D, so that they may retain their engagement with the teeth of the sprocket-wheels without slipping.

Swinging upon pivots $f$, between the guides of the carrying-chains and above the driving-shaft G, are the saw-frames O, which are bifurcated and embrace the pulleys P upon the driving-shaft, motion being given to the saws by a belt from said pulleys P to the pulleys P' upon the saw-arbors, which are located across the opposite ends of the swinging frames O. In order to raise these frames, so as to bring either of the saws in the series above the table, when desired, the following mechanism is employed:

Revolving in suitable bearings at the rear of the machine, beneath the table, are the crank-shafts Q, of a length equal to the distance between two of the swinging saw-frames. Each end of these crank-shafts carries a crank, the cranks at opposite ends of each shaft radiating in opposite directions. To the pins of these cranks are connected pitmen $g$, which pass upward through the sleeves $h$, pivoted at their upper ends to the swinging saw-frames. It will be seen that by this arrangement as the crank-shaft revolves the saw-frames, connected with the cranks at their opposite ends, will be alternately raised and lowered. In order to give motion to these crank-shafts when desired, each of them is provided with a gear-wheel, R, which engages with a similar wheel, R', secured to one member of the tubular-shaft S. This shaft is carried in suitable bearings upon the brackets F' at the rear of the machine, and consists of as many parts as there are crank-shafts to be operated, the central part or core, $i$, extending the full length of the machine and operating the last crank-shaft in the series, and the next concentric tube operating the next crank-shaft, and so on, an additional tube being used to operate each additional crank-shaft. To give motion to the several parts of this shaft, a peripherally-grooved hand-wheel, $k$, is secured to each part where they project from the end of the machine. It will be apparent that as either of these hand-wheels is revolved the corresponding crank-shaft with which it is connected will be turned, thus raising one or the other of the attached swinging saw frames. In order to give the operator full control over all the saws without being compelled to travel from end to end of the machine, and at the same time allow him to have a clear view of the apparatus and the lumber upon the table, a platform, T, is suspended or otherwise suitably sustained above the rear side of the table. This platform carries upon the braces by which it is steadied a series of vertically-placed sheaves, $m$, and another series of horizontal sheaves, $n$. Around these sheaves and the hand-wheels $k$ pass the endless ropes $l$, in number equal to the number of hand-wheels employed. At suitable points on these ropes are placed the hand-holes $n'$. It will be evident that the operator, standing upon the platform, can, by grasping one or more of these hand-holds and pulling to the right or left, as the case may be, turn the hand-wheels, and with them the shafts to which they are attached, thus causing the gear-wheel upon the shaft to act upon the corresponding gear of a crank-shaft, and bring one of the saws of the pair operated by said crank-shaft above the surface of the table, so that as the board is carried forward by the carrying-chains it will come in contact with said saw or saws and be severed at the point or points desired.

As it is desirable that there should be some means connected with the mechanism by which the operator may know when the proper revolution has been imparted to the hand-wheel, and also to retain the latter in such a position that the two saws operated by each crank-shaft shall be held in place beneath the table when not in use, suitable cam-like projections, $p$, are attached to or formed on the periphery of each hand-wheel, said projections having each a notch, into which the extremity of either end of the plate-spring $r$ may enter and hold the wheel in place until it is desired to release it, when a strong pull upon the rope will force the spring out of the notch and allow the wheel to be turned. By placing two of these notched cams upon the periphery of each hand-wheel at suitable distances from each other, the saws will be held either above or below the table as the spring catches in either one or the other of the notches.

As it is sometimes desirable to operate the saws from the front of the table, each swinging saw-frame may be connected, by a rod, $t$, with the lever T' beneath the floor. This lever is pivoted near the middle of its length, and is provided at the end which comes in front of the machine with an upwardly-projecting stem, $v$, which extends above the floor and carries upon its top a foot-plate, $x$. It will be obvious that when the foot of the operator presses upon and pushes down the foot-plate the rod $t$ at the opposite end of the lever will rise, carrying the swinging frame with it, this movement of the swinging frame being independent of the crank-shaft and cranks, as the sleeve $h$ slides up on the pitman $g$ without disturbing the crank mechanism.

The operation of the several parts of the machine will be readily understood by those conversant with the art to which it pertains from the preceding description, taken in connection with the drawings. It is therefore deemed unnecessary to give a detailed description of the various movements produced by the means shown and heretofore explained.

Having thus described my invention, I claim as new, and desire to secure by Letters Patent, the following:

1. In a lumber-trimmer, the combination, with the saw-table having transverse slots, the frames O, pivoted to said table and carrying circular saws, and the platform T, placed above the saw-table, of a crank-shaft, Q, having pitmen $g$ attached to its crank arms or pins, the sleeves $h$, pivoted to the swinging saw-frames, the tubular shaft S, gears R R', grooved hand-wheels $k$, sheaves $m$ $n$ upon the elevated platform, and the endless ropes $l$, for connecting said hand-wheels and sheaves, substantially as described.

2. In a lumber-trimmer, a crank-shaft, Q, and pitman $g$, in combination with a sleeve, $h$, sliding on said pitman, and a swinging saw-frame, O, carrying the saw and connected to said sleeve, all arranged as set forth, to adjust the saws vertically and allow their adjustment independently of the crank-shaft, substantially as described.

3. In a lumber-trimmer, the combination, with the swinging saw-frame O, hinged at one end to the machine-frame, and provided at its other end with a pivoted sleeve, $h$, of the crank-shaft Q, having a pitman, $g$, upon which said sleeve is mounted, the lever T', pivoted beneath the saw-frame and having stem $v$ and foot-plate $x$, and the rod $t$, for connecting said lever and saw-frame, substantially as described.

4. In a lumber-trimmer, the combination of a slotted inclined table, the sprocket-wheels E E', mounted in the frame of said table, the endless chains D, having projections $a$, the vertically-swinging frames O, pivoted at one end to the table-frame and carrying circular saws, the crank-shaft Q, having pitmen $g$ and gear R, the sleeves $h$, pivoted to the saw-frames and engaging said pitmen, the sectional tubular shaft S, having gear R' and grooved hand-wheels $k$, the elevated platform T, sheaves $m$ $n$ thereon, and endless ropes $l$, placed on said sheaves and hand-wheels, substantially as described.

5. In a lumber-trimmer, the combination, with a slotted table and saw-carrying frames pivoted beneath said table, of an elevated platform for the machine attendant, a crank-shaft journaled beneath said table and having an operative connection with the saw-frames, a shaft carrying grooved hand-wheels, gears for connecting said shaft with the crank-shaft, vertical and horizontal sheaves mounted on the elevated platform, and endless ropes passed over said sheaves and hand-wheels, whereby the saw-frames can be simultaneously actuated from said elevated platform, substantially as described.

In testimony whereof I hereunto affix my signature in presence of two witnesses.

ALEXANDER RODGERS.

Witnesses:
C. L. HOUSEMAN,
FRED SUTCLIFFE.